July 14, 1925.  
B. W. BARISH  
COOKING UTENSIL  
Filed Sept. 15, 1923
1,546,190
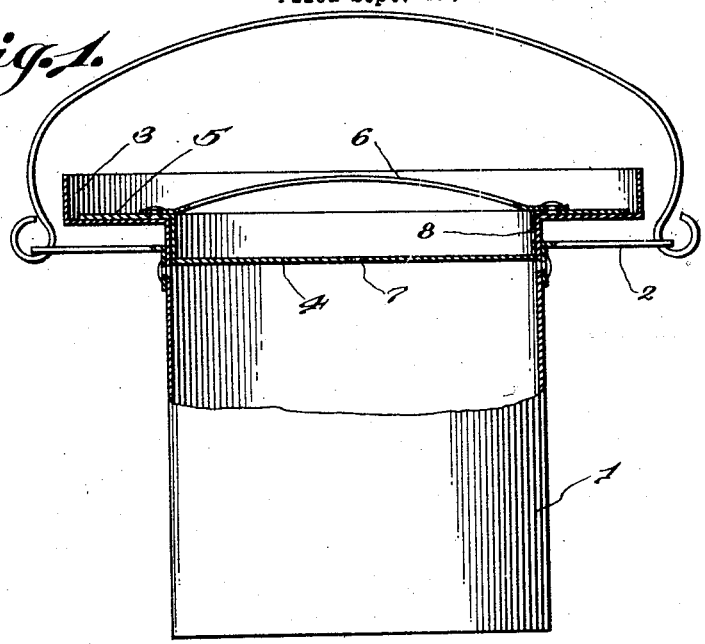
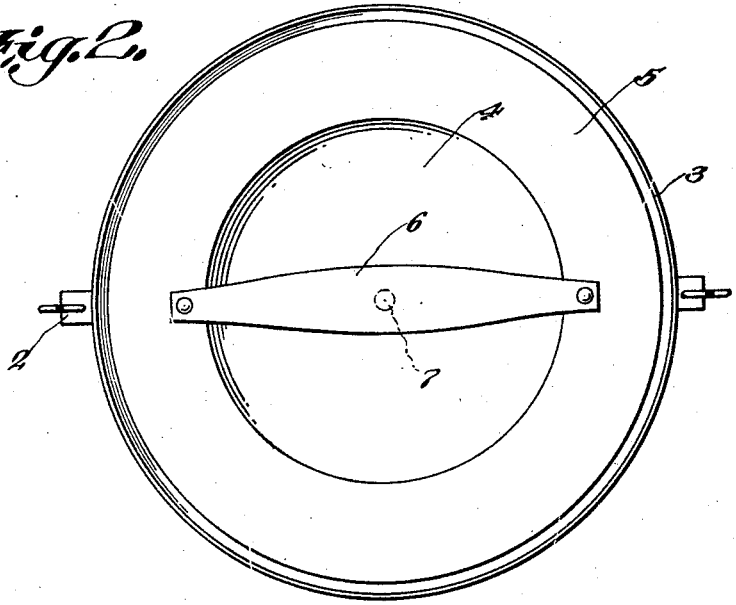
Bejtrach W. Barish, INVENTOR  
BY Victor J. Evans, ATTORNEY Patented July 14, 1925.

1,546,190

UNITED STATES PATENT OFFICE.

BEIRACH W. BARISH, OF CHICAGO, ILLINOIS.

COOKING UTENSIL.

Application filed September 15, 1923. Serial No. 662,906.

*To all whom it may concern:*

Be it known that I, BEIRACH W. BARISH, a citizen of the United States, residing at Chicago, in the county of Cook and State of Illinois, have invented new and useful Improvements in Cooking Utensils, of which the following is a specification.

This invention relates to cooking utensils, and an object of the invention is to provide a kettle or analogous container which is designed to eliminate the inconveniences contingent with the boiling over of various types of liquids such as milk, cocoa or the boiling over of liquids used in cooking vegetables or the like.

Another object of this invention is to provide a kettle as specified which has an overflow chamber into which the liquid will boil and which drains back into the kettle, thereby eliminating the need of constant watching of the liquid while cooking.

Other objects of the invention will appear in the following detailed description taken in connection with the accompanying drawings wherein:—

Fig. 1 is a view partly in section and partly in side elevation of the improved kettle.

Fig. 2 is a top plan of the kettle.

Referring more particularly to the drawings, the improved kettle comprises the kettle body 1 which is cylindrical in shape, as usual in the construction of cooking utensils and which has a carrying handle 2 attached thereto. A shallow pan-like flange 3 is formed about the upper open end of the kettle body 1 and provides a support for the protector 4 which is pan-like in shape and has a horizontal flange 5 about its upper edge to which a handle 6 is attached. The handle 6 extends diametrically across the protector 4 and is wider at its central portion, as clearly shown in Fig. 2 of the drawings so as to form a protector above the opening 7. The opening 7 is in the center of the bottom of the protector 4 and the liquid and kettle 1 when boiling and overflowing boils upwardly through the opening 7 this upward movement being retarded by the wider central portion of the handle 6. The overflowing fluid collects in the body of the protector 4, which is comparatively shallow and will permit the overflowing fluid to spread out and cool and drain back into the kettle 1 through the drain opening 8 and through the opening 7. It will be understood that the body of the protector 4 will fit loosely in the upper open end of the body 1 so that there will be sufficient space between the walls of the protector and body to permit the flow therethrough of any liquid draining out through the opening 8. In case the quantity of liquid boiling over into the protector 4 is greater than the capacity of the protector the liquid will flow over the flange D into the pan-like flange 3 where it will be further spread out and allowed to cool and returned to the kettle 1 through the openings 8 and 7.

From the foregoing description taken in connection with the accompanying drawings it will be apparent that by use of the improved kettle the need of concentrated attention on the fire, and kettle will not be necessary when the kettle contains liquid which readily boils over such as milk, cocoa or the like. It is understood that the protector 4 is removed when the kettle is filled.

It is, of course, to be understood that the invention may be constructed in other manners and the parts associated in different relations and, therefore, I do not desire to be limited in any manner except as set forth in the claim hereunto appended.

Having thus described my invention what I claim is:

A cooking utensil comprising a body, having an open top, a shallow pan-like flange integral with the body at its open end and extending horizontally from the upper end of the body, a pan-like protector loosely fitted in the upper open end of said body, having a central opening, the wall of said protector having a drain opening, an annular horizontally disposed flange on said protector adapted to rest upon the flange on the body and a handle member extending diametrically across the protector above the opening.

In testimony whereof I affix my signature.

BEIRACH W. BARISH.